(12) United States Patent
Samardzija et al.

(10) Patent No.: US 11,704,529 B2
(45) Date of Patent: Jul. 18, 2023

(54) TRACKER TAG WITH DUAL-PURPOSE ANTENNA COMPONENTS

(71) Applicant: Plume Design, Inc., Palo Alto, CA (US)

(72) Inventors: Miroslav Samardzija, Mountain View, CA (US); Hsiang Yin Cheng, Taipei (TW); Ming-Tsung Su, Taipei (TW); Liem Hieu Dinh Vo, San Jose, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 135 days.

(21) Appl. No.: 17/511,877

(22) Filed: Oct. 27, 2021

(65) Prior Publication Data

US 2023/0126650 A1   Apr. 27, 2023

(51) Int. Cl.
*G08B 21/00* (2006.01)
*G06K 19/07* (2006.01)
*H01Q 1/00* (2006.01)
*H01Q 1/22* (2006.01)

(52) U.S. Cl.
CPC ..... *G06K 19/0724* (2013.01); *G06K 19/0706* (2013.01); *H01Q 1/007* (2013.01); *H01Q 1/2291* (2013.01); *H04Q 2201/10* (2013.01)

(58) Field of Classification Search
CPC ........... G06K 19/0724; G06K 19/0706; H01Q 1/007; H01Q 1/2291; H04Q 2201/10
See application file for complete search history.

(56) References Cited

U.S. PATENT DOCUMENTS

| | | |
|---|---|---|
| 6,853,197 B1 | 2/2005 | McFarland et al. |
| 6,961,545 B2 | 11/2005 | Tehrani et al. |
| 7,245,882 B1 | 7/2007 | McFarland |
| 7,245,893 B1 | 7/2007 | Husted et al. |
| 7,251,459 B2 | 7/2007 | McFarland et al. |
| 9,136,937 B1 | 9/2015 | Cheng et al. |
| 9,160,584 B1 | 10/2015 | Kavousian et al. |
| 2013/0090057 A1 | 4/2013 | Green et al. |
| 2013/0293424 A1 | 11/2013 | Zhu et al. |
| 2014/0009344 A1 | 1/2014 | Zhu et al. |
| 2014/0009355 A1* | 1/2014 | Samardzija .......... H01Q 9/0407 343/789 |
| 2014/0112511 A1 | 4/2014 | Corbin et al. |
| 2014/0226572 A1 | 8/2014 | Thota et al. |
| 2014/0340265 A1 | 11/2014 | Vazquez et al. |
| 2015/0099474 A1 | 4/2015 | Varga et al. |
| 2015/0109167 A1 | 4/2015 | Varga et al. |

(Continued)

*Primary Examiner* — Mark S Rushing
(74) *Attorney, Agent, or Firm* — Nicholas Martin; Greenberg Traurig, LLP

(57) ABSTRACT

Tracker tags, smart tags, locator tags, and the like are provided. A portable tracker device, according to one implementation, includes a housing having a front cover and a back cover. The portable tracker device also includes Radio Frequency (RF) circuitry configured to operate within at least one of a Bluetooth (BT) frequency range and an Ultra-Wideband (UWB) frequency range. Also, the portable tracker device includes a piezoelectric device having a first conductive plate and a second conductive plate. The RF circuitry utilizes at least one of the front cover, the back cover, the first conductive plate, and the second conductive plate as one or more antennas.

18 Claims, 12 Drawing Sheets

(56) References Cited

U.S. PATENT DOCUMENTS

| | | |
|---|---|---|
| 2015/0195836 A1 | 7/2015 | Malkin et al. |
| 2015/0302976 A1 | 10/2015 | Chang et al. |
| 2015/0303568 A1 | 10/2015 | Yarga et al. |
| 2015/0311960 A1 | 10/2015 | Samardzija et al. |
| 2016/0056526 A1* | 2/2016 | Li .......................... H01Q 9/42 |
| | | 343/702 |
| 2016/0336643 A1 | 11/2016 | Pascolini et al. |
| 2019/0280375 A1* | 9/2019 | Ahn ...................... H01Q 1/273 |
| 2019/0361045 A1* | 11/2019 | Abdolvand ............ G01P 15/125 |
| 2020/0004997 A1* | 1/2020 | Kawaguchi ............. H04W 4/80 |
| 2021/0224492 A1* | 7/2021 | Eisendle ........... H04W 52/0229 |
| 2023/0097880 A1* | 3/2023 | Cheng .................. H01Q 1/273 |
| | | 343/718 |

* cited by examiner

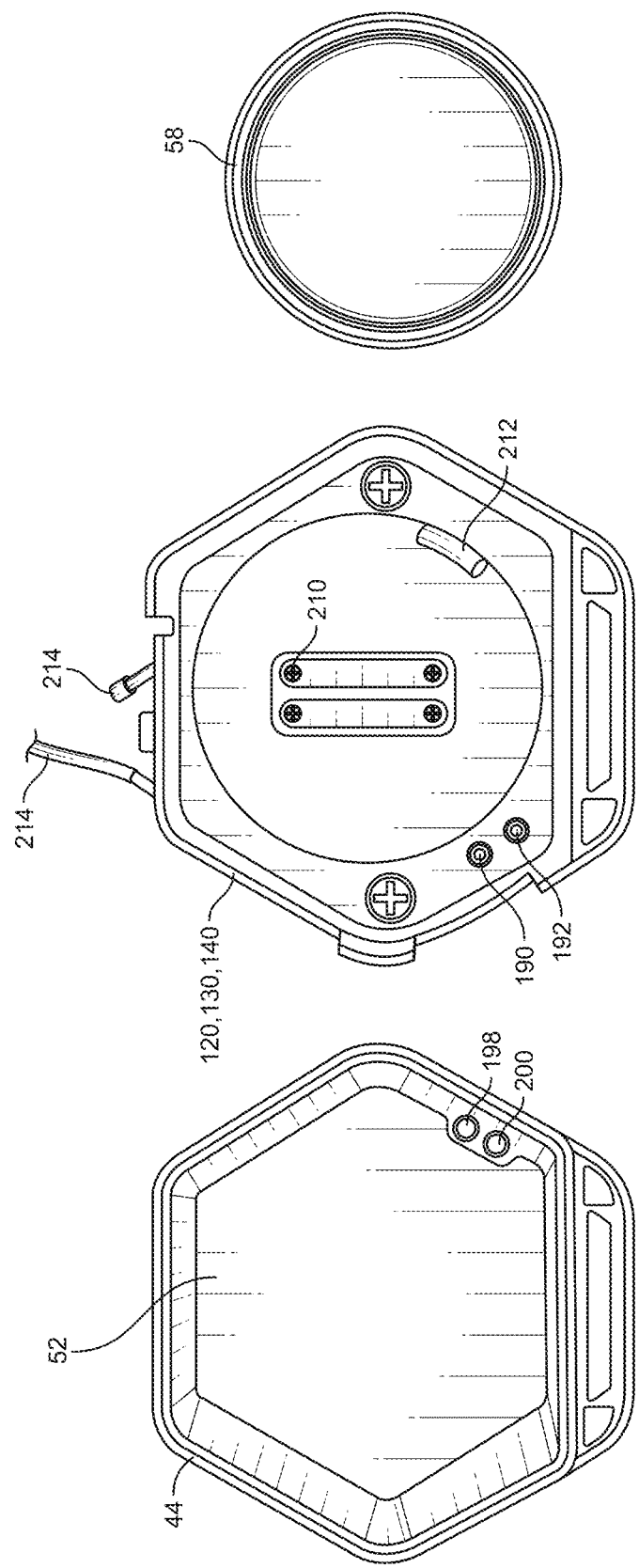

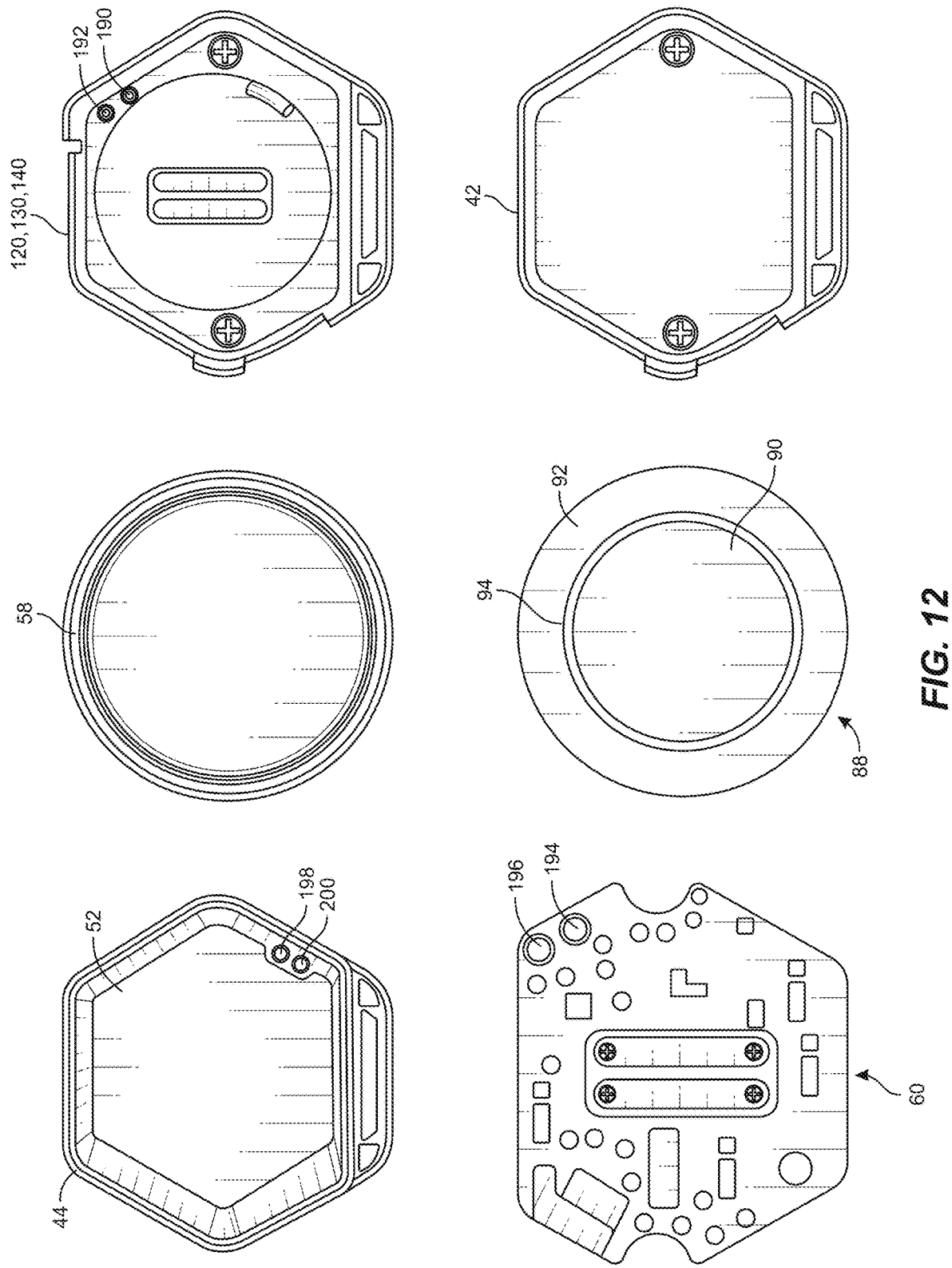

TRACKER TAG WITH DUAL-PURPOSE ANTENNA COMPONENTS

TECHNICAL FIELD

The present disclosure generally relates to location tracking systems. More particularly, the present disclosure relates to the construction of tracker tags, whereby certain components of the tracker tags double as Ultra-Wideband (UWB) and Bluetooth antennas.

BACKGROUND

Recently, tracker tags (also known as locator tags, smart tags, etc.) have become popular consumer electronic devices. For example, many companies (e.g., Apple, Samsung, Tile, among others) have created different types of tracker tags having different functionality. The purpose of tracker tags is to help users find objects to which the tracker tags are attached.

On the outside, tracker tags appear like classical key chain fobs. They are small (e.g., about the size of a token or coin) and can be attached to key chains, backpacks, purses, pet collars, etc. using a key ring, for example, and can also be attached to TV remotes, garage door openers, etc. using tape or other adhesive material. Tracker tags have wireless capabilities to enable pairing with another wireless consumer device (e.g., smart phone, laptop computer, pod device, etc.). This wireless link between the tracker tag and smart phone allows for the tracker tag to be tracked down and located, thereby allowing a user to find her belongings if they are lost or misplaced. Depending on the particular design of the tracker tag, the user can use the tracking system to find the tracker tag if it is within a certain area (e.g., within Bluetooth range, within a house or room, near the smart phone, etc.).

As with any type of wireless device, the wireless capabilities of the device require one or more antennas. One particular issue with small tracker tags (or other small wireless devices) is that the size (e.g., length) of an antenna for communication at high frequencies (e.g., Bluetooth range, Ultra-Wideband range, etc.) is limited by the size of tracker tag. Typical tracker tags are designed with a plastic casing to allow for better antenna performance and use chip antennas or PCB antennas. Also, designs of typical tracker tags normally must dedicate a relatively large amount of volume (space) for these antennas. It can be challenging to design and integrate one or more antennas into these tracker tags, especially since consumers prefer that these devices have a small size. In addition, these antennas normally have low performance as they typically rely on ground currents running through a PCB which is small. That is, a smaller antenna volume results in less antenna efficiency/performance.

Therefore, there is a need in the field of tracker tags and other small wireless consumer devices to overcome the issues that arise with the design of antennas within a small volume. The embodiments of the present disclosure, as described below, overcome many of these known antenna issues prevalent in conventional consumer products.

BRIEF SUMMARY

The present disclosure is directed to tracking or locating systems for enabling a user to find missing objects. When a tracker tag is attached to an item that the user wishes to locate, the user may utilize a suitable application on a wireless "searching" device (e.g., mobile phone) for communicating with the tracker tag. Various functions may be performed by the wireless searching device for directing the user to the location of the tracker tag. More particularly, the present disclosure is directed to antenna assemblies of these tracker tags. The antenna assemblies may include components of tracker tags that have other purposes. In this way, these dual-purpose components are configured to double as antenna components.

A portable tracker device (e.g., tracker tag), according to one implementation, includes a housing having a front cover and a back cover. The portable tracker device also includes Radio Frequency (RF) circuitry configured to operate within at least one of a Bluetooth (BT) frequency range and an Ultra-Wideband (UWB) frequency range. Also, the portable tracker device includes a piezoelectric device having a first conductive plate and a second conductive plate. In operation, the RF circuitry utilizes at least one of the front cover, the back cover, the first conductive plate, and the second conductive plate as one or more antennas.

In some embodiments, the piezoelectric device of the above-described portable tracker device may further include a dielectric plate oriented between the first and second conductive plates. The piezoelectric device may therefore be configured as a buzzer or speaker for creating an audible signal to reveal the location of the portable tracker device.

The back cover of the housing, according to some embodiments, may include a conductive material and may be configured as a first antenna of the one or more antennas, whereby the RF circuitry may be configured to use the first antenna for BT communication. The second conductive plate of the piezoelectric device may be positioned adjacent to the front cover of the housing and may be configured as a second antenna of the one or more antennas, whereby the RF circuitry may be further configured to use the second antenna for UWB communication. In some embodiments, the front cover of the housing may include a conductive material and may be connected directly to the second conductive plate of the piezoelectric device.

Also, the portable tracker device may include a UWB switch and a diplexer. The UWB switch may be configured to receive a UWB feed from the RF circuitry and create first and second UWB feeds. The first UWB feed may be provided to the diplexer and the second UWB feed may be provided to the second conductive plate of the piezoelectric device. Also, the diplexer may be configured to receive a BT feed from the RF circuitry and the first UWB feed from the UWB switch to thereby create a mixed feed that is provided to the back cover of the housing.

The portable tracker device, in some implementations, may further include a piezoelectric driver in electrical communication with the first conductive plate and the second conductive plate of the piezoelectric device. The piezoelectric driver may be configured to provide signal pulses for driving the piezoelectric device. Also, the portable tracker device may include a battery configured to provide power to the RF circuitry and the piezoelectric driver. The portable tracker device may also include first and second inductors, where the first inductor is configured to substantially isolate RF signals of the first conductive plate from audio signals of the piezoelectric driver, and where the second inductor is configured to substantially isolate RF signals of the second conductive plate from the audio signals of the piezoelectric driver.

At least one of the front cover, the back cover, the first conductive plate, and the second conductive plate being used as the one or more antennas may be configured without any dedicated antenna structure. In other words, the antenna components are not dedicated components, but are derived from the components that already exist in the portable tracker device, where these components serve a dual purpose.

According to some implementations, the portable tracker device may further include feed matching circuitry and short matching circuitry. The feed matching circuitry may be configured for matching BT and UWB frequencies with the one or more antennas. The short matching circuitry may be configured for matching the one or more antennas to ground. The portable tracker device may also include first and second capacitors, where the first capacitor may be configured for substantially isolating audio frequency signals of the first conductive plate from the short matching circuitry and the second capacitor may be configured for substantially isolating audio frequency signals of the second conductive plate from the feed matching circuitry.

The back cover of the housing, in some cases, may include a conductive material and may be oriented in parallel with the second conductive plate of the piezoelectric device to form a Yagi-type antenna. In addition, the portable tracker device may include a battery and a battery holder, where the battery may be configured to provide power to the RF circuitry. The battery holder, for example, may be configured to support the battery as well as one or more layers of conductive and non-conductive plates separating the battery from the back cover. In some embodiments, one or more of the front cover and back cover may include a non-conductive material and a) a Laser Direct Structuring (LDS) conductive pattern, b) conductive tape, and/or c) a conductive trace formed on the non-conductive material. The portable tracker device may further include one or more pogo pins configured to enable electrical communication between the RF circuitry and the one or more antennas.

An antenna assembly, according to some implementations, may include at least one a front cover and a back cover of a housing of a portable electronic device and may further include at least one of a first conductive plate and a second conductive plate of a piezoelectric device (e.g., which may be incorporated in the portable electronic device). An RF circuit (e.g., which may be incorporated in the portable electronic device) may be configured to operate within at least one of the Bluetooth (BT) frequency range and the UWB frequency range and may be configured to utilize at least one of the front cover, the back cover, the first conductive plate, and the second conductive plate as one or more antennas.

A locating system, according to some implementations, may include one or more tracker tags and one or more searching devices. Each of the one or more tracker tags may include a housing having a front cover and a back cover and RF circuitry configured to operate within at least one of the Bluetooth (BT) frequency range and the UWB frequency range. Each tracker tag may also include a piezoelectric device having a first conductive plate and a second conductive plate. The RF circuitry may be configured to utilize at least one of the front cover, the back cover, the first conductive plate, and the second conductive plate as one or more antennas. Each of the one or more searching devices may be configured to locate the one or more tracker tags using one or more of BT communication and UWB communication with the one or more tracker tags. In some embodiments, each of the one or more tracker tags may include means for attachment to an item to be tracked. Also, each of the one or more searching devices may be a smart phone, a pod device, or a laptop computer.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 11 is a diagram illustrating a front view of various parts of the tracking tag of FIG. 3, according to various embodiments of the present disclosure.

FIG. 12 is another diagram illustrating a front view of various parts of the tracking tag of FIG. 3, according to various embodiments of the present disclosure.

DETAILED DESCRIPTION

Figure 1:
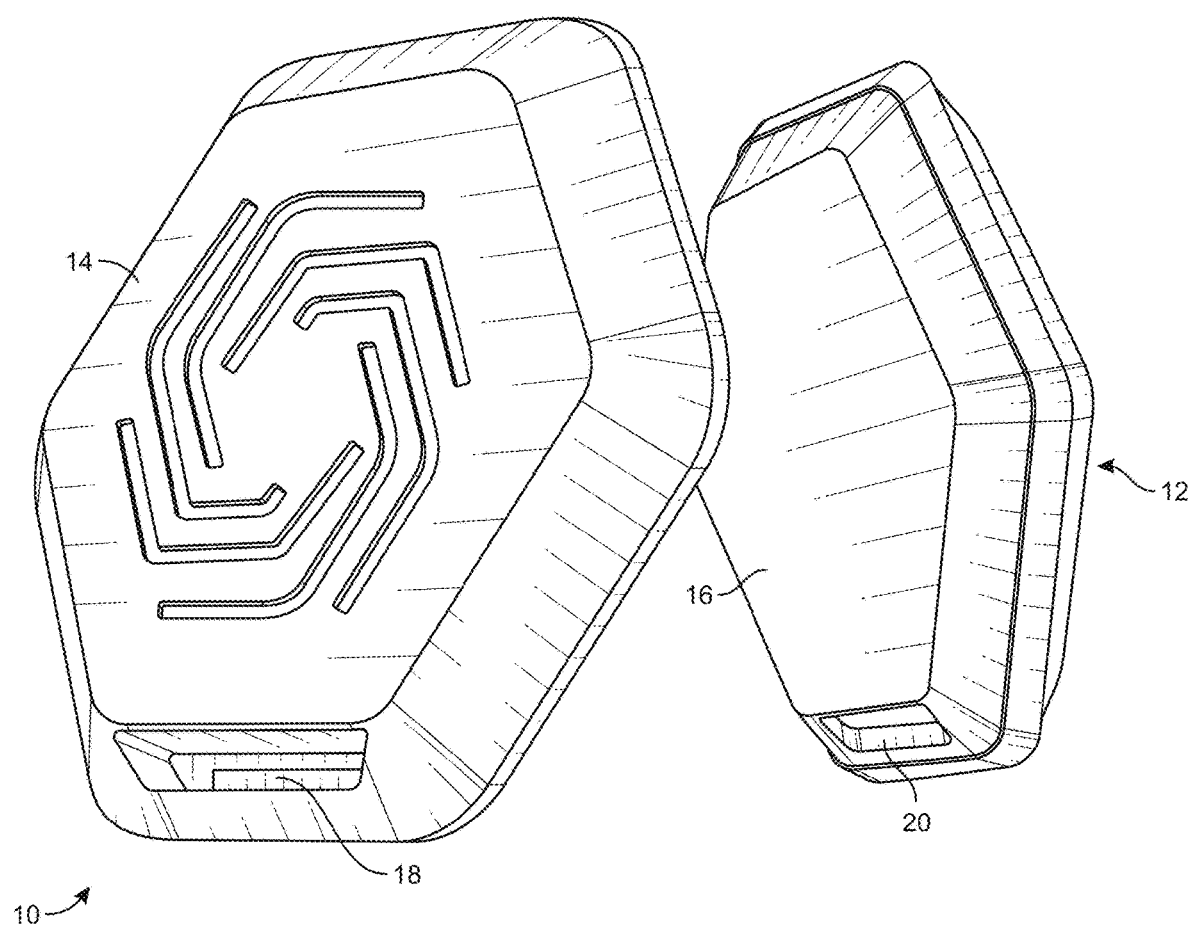
FIG. 1 is a diagram illustrating a perspective view of a pair of tracker tags, according to various embodiments of the present disclosure.

The present disclosure relates to tracking/locating systems. In particular, the tracking systems described in the present disclosure are configured for use with Radio Frequency (RF) communication, such as Bluetooth (BT) frequency communication and/or Ultra-Wideband (UWB) frequency communication. Also, tracker tags (e.g., also known as locator tags, smart tags, etc.) may include BT and/or UWB functionality and may be configured to communicate with a wireless device (e.g., mobile phone, smart phone, pod, tablet, laptop computer, etc.). In this respect, a user may utilize the wireless device to track or locate the tracker tags, particular if an item (e.g., key chain, backpack, purse, wallet, pet collar, etc.), which has a tracker tag attached thereon, is misplaced or lost. Thus, the tracking systems can assist the user with finding the lost items.

In some embodiments, the tracker tag may be equipment with suitable circuitry and antenna structures to communicate in both the BT and UWB frequency ranges. Thus, the tracker tag and "searching" device (e.g., smart phone) may use both BT and UWB to enable the tracking or locating process. For example, BT may be used to help the user find a room (e.g., of a house) in which the item is lost. After this, the system may utilize UWB to pinpoint the exact location with greater resolution. An example of a use case may be a situation where a user has attached a tracker tag on a keychain. Then, when the user loses her keys (e.g., in the sofa seats, in her purse, in the car, behind the dresser, on the bathroom sink, in the pocket of her dirty jeans, etc.), the searching device can be utilized (if this has not been lost too) to help her reunite with her keys.

According to the embodiments of the present disclosure, the tracker tag can be manufactured with a very small form factor. In some embodiments, the tracker tag may be configured to hold a replaceable battery (e.g., coin-sized 3V battery, such as CR2032, or the like). In some embodiments, the tracker tag may use less power than conventional tracker tags. For example, to achieve the small size, the embodiments of the present disclosure may reuse components of the tracker tag for the antennas.

Using UWB allows very accurate location, while BT allows for longer range. By using both, the tracker tag can be located from a long distance, and then more precisely as the user comes closer to the tracker tag. Making the tracker tag as small as possible is a feature that is usually desirable for many customers. Making the UWB antenna small is made additionally difficult by the wide bandwidth and multi-band operation that is normally required.

While conventional tracker tags may use separate antennas for UWB and BT communication and may use dedicated space within the device for each antenna, the embodiments of the present disclosure, on the other hand, use the existing components within the tracker tags, where these existing components have functionality for purposes other than those associated with antennas or wireless communication. For example, the embodiments described herein may utilize parts of the housing itself and/or a piezoelectric device (e.g., buzzer, speaker, etc.) contained within the housing.

In some cases, the antennas may include antennas formed on a Printed Circuit Board (PCB). For example, antenna traces may be formed on a glass-reinforced epoxy laminate material (e.g., Flame-Retardant (FR) material, such as FR-4). The antenna may then have to share space with other electrical components, radio components, Integrated Circuits (ICs), other conductive traces, etc. on the PCB. In some cases, the PCB may include Laser Direct Structuring (LDS) for forming traces (e.g., antenna patterns) on the board. For example, LDS may refer to the process of applying electronic conductive paths or traces directly onto non-conductive parts or materials during manufacturing. The LDS allow conductive patterns within small packages, such as tracker tags, where the geometric spaces are dependent on the particular shape or form factor of the small portable device.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 shows an embodiment of a pair of tracker tags 10, 12, where the front cover 14 of the first tracker tag 10 is visible in FIG. 1 and the back cover 16 of the second tracker tag 12 is visible. It should be noted that the tracker tags 10, 12 may include the same configuration or design. The front cover 14 includes an opening 18 and the back cover 16 also includes an opening 20. When the front cover 14 and back cover 16 are connected together (e.g., by snapping interlocking elements together), the openings 18, 20 allow one or both of the tracker tags 10, 12 to attached to a key ring, a ring binder, a carabiner, a snap element, a clip element, a loop element, or other similar devices. When connected together to form a single unit, the tracker tag 10, 12 may be waterproof or water resistant. In this way, the tracker tags 10, 12 can be attached to various types of items that a user may wish to track.

To design an efficient antenna for use with the tracker tags 10, 12 or other similarly-sized tracking/locating device, the size of the antenna may be a whole wavelength, one half of a wavelength, or one fourth of a wavelength at the frequency of operation. For example, Bluetooth (BT) communication may include Wi-Fi operation at a number of channels within a frequency range of about 2.40 GHz to about 2.48 GHz, which corresponds to a wavelength of about 120 mm. For UWB, the channel 5 wavelength is within a frequency range of about 6.25 GHz to about 6.75 GHz and centered around 6.50 GHz (e.g., a wavelength of about 46 mm). For channel 9 UWB, the frequency range is about 7.75 GHz to about 8.25 GHz, centered at about 8.00 GHz. Some tracker tags (e.g., tracker tags 10, 12) may vary in diameter from about 32 mm to 43 mm and may vary in thickness from about 6 mm to 12 mm. They could be wider and/or thicker, but smaller ones are more popular with consumers. It may be noted that entire BT bandwidth is only about 80 MHz, while the UWB bandwidth is about 500 MHz for each channel, for a total of 1.0 GHz if two UWB sets of signals are used (i.e., channels 5 and 9).

The size of larger tracker tags cannot normally provide the minimum required volume to pack an antenna, even when considering the size of one fourth of the wavelength of BT (i.e., 120 mm/4=30 mm). In addition to packing an antenna into the product, it is necessary to allot some volume for an antenna carrier (e.g., PCB antenna, FR-4 antenna, etc.) or plastic carrier (e.g., LDS-type antennas), as well as to clear volume of nearby components and ground. Because of the shortage of volume in most tracker tags, antennas may be miniaturized by meandering antenna patterns, loading it with plastic carrier (e.g., in LDS-type antennas), loading it with high dielectric ceramics (e.g., chip antennas, etc.), or my other techniques. However, this miniaturization may result in the significant degradation of antenna performance.

In some embodiments, antennas may be designed for UWB (channel 5) operation at one quarter wavelength of about 12 mm (i.e., 46 mm/4 is about 12 mm), which should theoretically fit into a product three times bigger. However, due to UWB's high bandwidth requirement (500 MHz), these antennas need to be wideband, which translates to much bigger antennas (i.e., bigger antenna size results in greater bandwidth). Hence, packing UWB into a tracker tag (e.g., tracker tags 10, 12) can be a challenge. However, the embodiments of the present disclosure provide solutions to overcome these obstacles.

Figure 2:
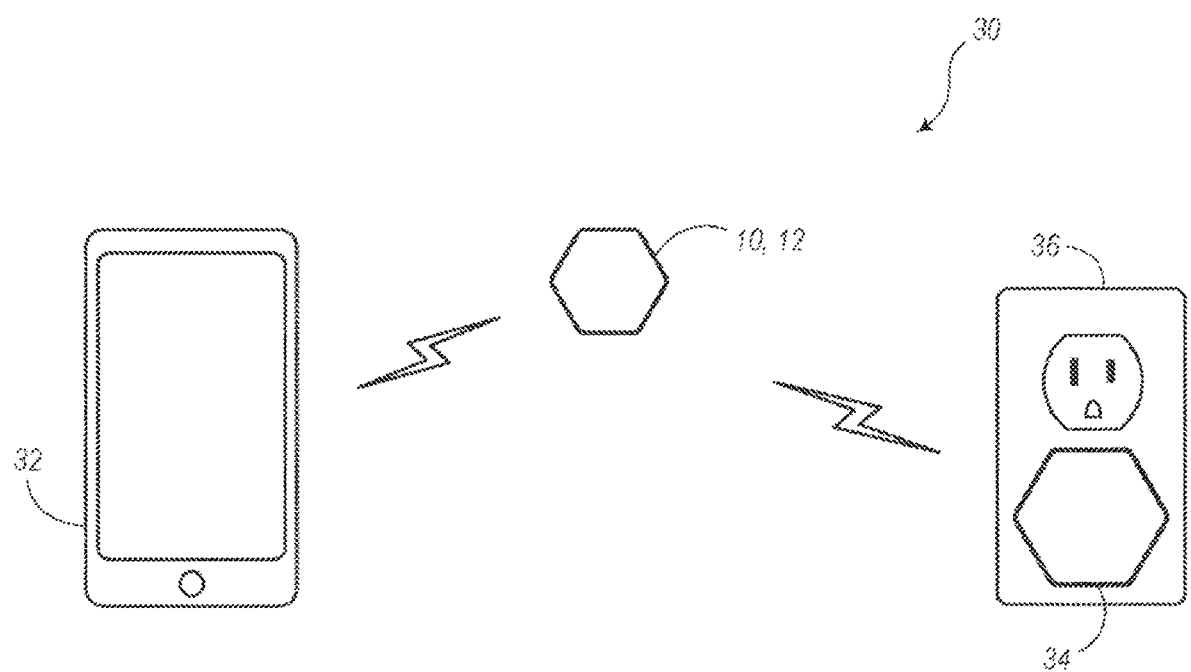
FIG. 2 is a schematic diagram illustrating a location tracking system, according to various embodiments of the present disclosure.

FIG. 2 is a schematic diagram illustrating an embodiment of a location tracking system 30 (or locating system). The location tracking system 30, according to various embodiments, may include one or more tracker tags 10, 12 and one or more "searching devices." For example, a first type of searching device 32 may be a mobile device (e.g., smart phone, portable tablet device, laptop computer, etc.) and a second type of searching device 34 may be a device that is removably inserted in an electrical outlet 36 and/or attached to another type of power supply, which may be part of a home, office, building, etc.

Each of the one or more tracker tags 10, 12 may include a housing having a front cover 14 and a back cover 16. Each tracker tag 10, 12 may also include internal components (not shown in FIG. 2), such as Radio Frequency (RF) circuitry configured to operate within at least one of a Bluetooth (BT) frequency range and an Ultra-Wideband (UWB) frequency range. The internal components may also include a piezoelectric device (e.g., buzzer, speaker) having a first conductive plate and a second conductive plate. The RF circuitry, according to various embodiments of the present disclosure, is configured to utilize at least one of the front cover 14, the back cover 16, the first conductive plate (not shown in FIG. 2), and the second conductive plate (not shown in FIG. 2) as one or more antennas. Each of the one or more searching devices 32, 34 may be configured to locate the one or more tracker tags 10, 12 using one or more of BT communication and UWB communication with the one or more tracker tags 10, 12.

In addition, the location tracking system 30, in some embodiments, may utilize cell phone towers, satellites, etc. for communication. Each of the one or more tracker tags 10, 12 may include means for attachment to an item to be tracked, such as the openings 18, 20, adhesive, tape, hook and loop elements (e.g., Velcro), or other suitable attachment means. Again, each of the one or more searching devices 32, 34 may be a smart phone 32, a pod device 34, a laptop computer, or other suitable wireless communication device, each searching device operating independently to find/locate one or multiple tracker tags (e.g., tracker tags 10, 12).

With the location tracking system 30 of the present disclosure, it is possible to track down and locate items that may easily get lost or misplaced, such as keys, backpacks, wallet, TV remote control, etc. Each of the tracker tags 10, 12 can individually be attached any such items to help with retrieving the items by use of the searching devices 32, 34. In some embodiments, the tracker tag 10, 12 may include a buzzer, speaker, or other audio output mechanism, whereby, when the searching device 32, 34 is triggered (e.g., by pressing a button on the device or in an app), BT and/or UWB communication links with the tracker tag 10, 12 and the tracker tag 10, 12 may then produce a sound (e.g., buzzing sound, beeping sound, verbal sounds, etc.), which can then steer the user to the right location. In some cases, the audio system (of either the tracker tag 10, 12 or searching device 32, 34) may change the tone, volume, etc. of an audio output as the user moves nearer to the lost item.

In some embodiments, the location tracking system 30 may include functionality to allow the detection of the distance between the searching device 32, 34 and the tracker tag 10, 12. This distance information can be communicated to the user (e.g., displayed on a screen of the smart phone 32, etc.). Also, some embodiments may allow directional detection to point the user in the right direction to find the item, which may utilize the UWG communication technology. According to some implementations, the location tracking system 30 may allow the tracking functionality even when the various devices (e.g., tracker tags 10, 12, searching devices 32, 34) are offline.

Figure 3:
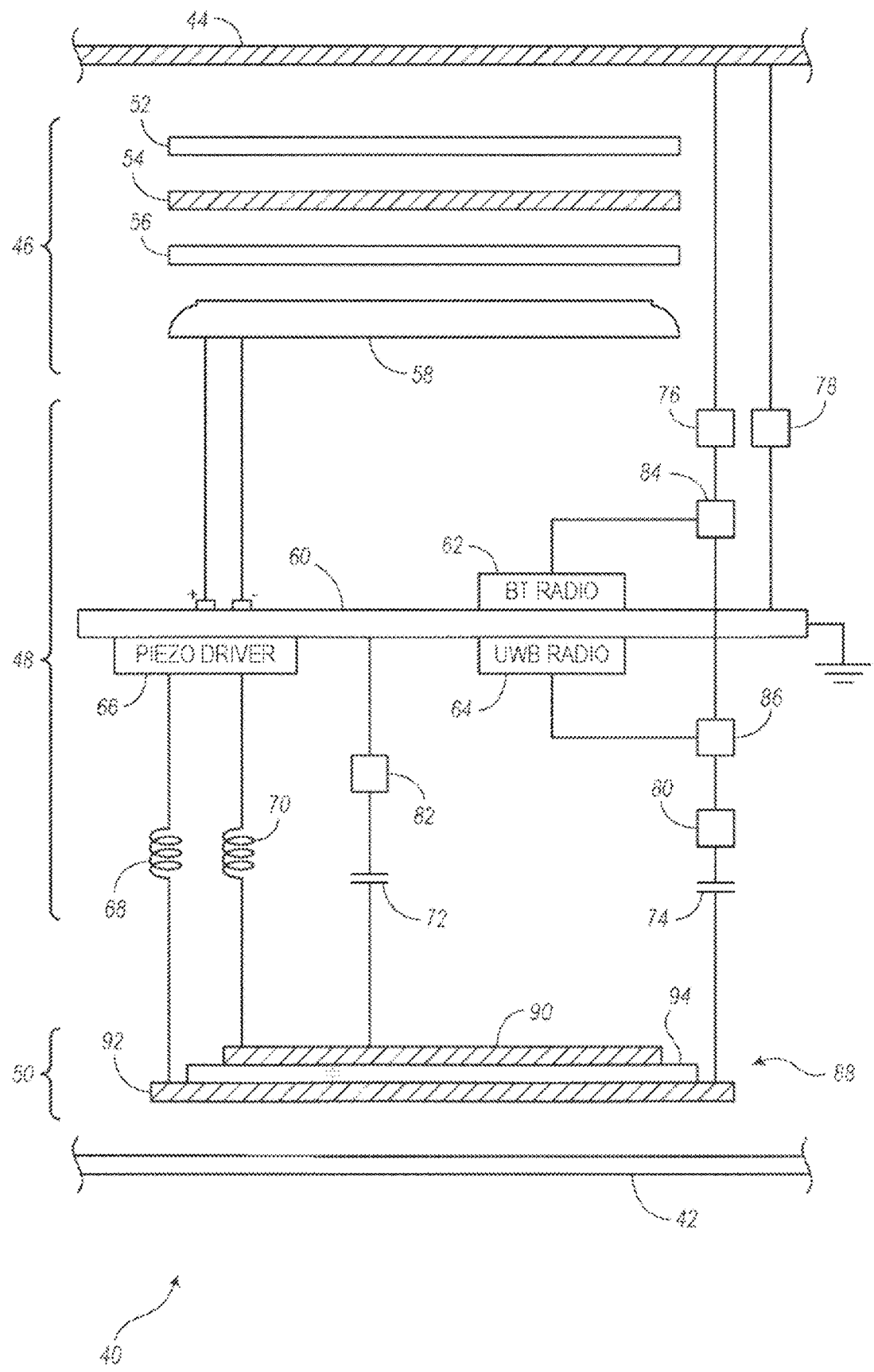
FIG. 3 is a schematic diagram illustrating an exploded side view of the construction of a tracking tag, according to various embodiments of the present disclosure.

FIG. 3 shows an embodiment of a tracker tag 40 (e.g., tracker tag 10, 12 or other tracker tags). The construction is shown in an exploded side view in FIG. 3. In this embodiment, the tracker tag 40 includes a housing including at least a front cover 42 (shown at the bottom of FIG. 3) and a back cover 44 (shown at the top of FIG. 3). Similar to the front cover 14 and back cover 16 in FIG. 1, the front and back covers 42, 44 of the tracker tag 40 of FIG. 3 may be configured to snap together, which may include a construction to prevent water or other elements from getting into an interior of the housing. For example, the front and back covers 42, 44 may include snap-together features (e.g., tabs, pockets, etc.) for allowing the pieces to be connected together. These snap-together features may also allow the opening of the housing to enable a user to replace a battery when necessary.

In addition, the tracker tag 40, as illustrated, includes a battery section 46, a circuitry section 48, and a piezo section 50. Specifically, the battery section 46 as shown includes a first non-conductive (non-metallic) spacer 52, a conductive shield 54, a second non-conductive spacer 56, and a battery 58. In some embodiments, the first and second non-conductive spacers 52, 56 may be omitted such that a first gap is formed between the back cover 44 and the conductive shield 54 and a second gap is formed between the conductive shield 54 and the battery 58. The battery 58 may be a replaceable 3V coin-type battery (e.g., CR2032).

The circuitry section 48 of the tracker tag 40 includes a Printed Circuit Board (PCB) 60 (e.g., RF board, card, board, etc.). In some alternative embodiments, the PCB 60 may be replaced with a Laser Direct Structuring (LDS) device, such as to conform to available space within the interior of the housing. A BT radio 62, UWB radio 64, and piezoelectric driver 66 may be positioned on either side of the PCB 60. For simplicity in the figure, the BT radio 62 is shown on a back side of the PCB 60 (i.e., top side of the PCB 60 as shown in FIG. 3) and the UWB radio 64 and piezoelectric driver 66 are shown on the front side of the PCB 60, but it should be understood that the components 62, 64, 66 may be either side in any combination.

The circuitry section 48 further includes inductors 68, 70 for choking (e.g., isolating, suppressing, blocking) high frequencies and capacitors 72, 74 for blocking low frequencies (or DC). The circuitry section 48 also includes a BT feed matching circuit 76 and a short matching circuit 78 for enabling BT communication via a first antenna. The circuitry section 48 also includes a UWB feed matching circuit 80 and a UWB short matching circuit 82 for enabling UWB communication via a second antenna. In some embodiments, the circuitry section 48 may also include a diplexer 84 and a UWB switch 86, which allow UWB communication on both antennas for operation in diversity and/or Angle of Arrival (AOA) modes. The components 68, 70, 72, 74, 76, 78, 80, 82, 84, 86 may be connected to or formed on the PCB 60.

The piezo section 50 of the tracker tag 40 includes a piezoelectric device 88, which may include a first conductive (e.g., metallic) plate 90, a second conductive (e.g., metallic) plate 92, and a non-conductive (e.g., dielectric) plate 94 sandwiched between the two conductive plates 90, 92.

The BT feed matching circuit 76 and short matching circuit 78 are configured between the BT radio 62 and the back cover 44 for matching impedance characteristics of the BT signals with the back cover 44 to enable efficient transfer of power from the BT radio 62 to the back cover 44. In this respect, the back cover 44 may include conductive material (partially or fully) and act as a BT antenna. In some embodiments, the back cover 44 may include a non-conductive material with conductive elements formed thereon acting as the antenna.

Also, the UWB feed matching circuit 80 is configured between the UWB radio 64 and the second conductive plate 92 of the piezoelectric device 88. The UWB short matching circuit 82 is configured between the UWB radio 64 or PCB 60 and the first conductive plate 90 of the piezoelectric device 88. With respect to embodiments in which two UWB signals are provided to two different antennas, so as to enable diversity and/or AOA modes, the UWB feed matching circuit 80 may be connected to the UWB switch 86, which in turn is connected to the UWB radio 64. In this arrangement, the UWB switch 86 is also connected to the diplexer 84. The diplexer 84 is configured to enable BT signals and UWB signals to be communicated to the back cover 44. For example, the diplexer 84 may be configured to implement frequency-domain multiplexing where a first (lower frequency) port receives a BT feed from the BT radio 62 and a second (higher frequency) port receives a UWB feed from the UWB radio 64 (via UWB switch 86). These two ports of the diplexer 84 are combined or multiplexed onto a third port for exciting the first antenna (e.g., back cover 44). Since BT and UWB occupy different frequency bands, the BT and UWB signals can exist on the output port without interfering with each other.

Therefore, the embodiments of the of tracker tag 40 may include a first mode of operation where a single frequency band is utilized (e.g., either BT or UWB), a second mode of operation where two frequency bands (e.g., BT and UWB) are utilized on two different antennas, a third mode of operation where BT and a first UWB signal is utilized on a first antenna and a second UWB signal is utilized on a second antenna, a fourth mode of operation where UWB and a first BT signal is utilized on a first antenna and a second BT signal is utilized on a second antenna, or other various combinations of BT and UWB utilization on one or more antennas. It may be noted that the BT radio 62 may be configured to feed BT signals to one or both of the antennas (e.g., back cover 44 and the second conductive plate 92 of the piezoelectric device 88) and that the UWB radio 64 may be configured to feed UWB signals to one or both of the antennas (e.g., back cover 44 and second conductive plate 92). Therefore, the BT radio 62 and UWB radio 64 can be switched with respect to the illustrated arrangement shown in FIG. 3.

As such, the BT and UWB antennas are designed to be fully incorporated or embedded in the already existing parts of the tracker tag 40. Thus, the back cover 44, which normally acts as part of housing for protecting the internal components of the tracker tag 40, may already be configured with conductive elements and may therefore be used as the first antenna. Also, the second conductive plate 92 of the piezoelectric device 88, which may typically be used for producing sound (or noise), can also be used as a second antenna. With the matching circuits 76, 78, 80, 82, these elements can double as antennas. In other words, they are dual-purpose devices for carrying out their regular duties, plus can be utilized as BT and/or UWB antennas. In some embodiments, the piezoelectric device 88 can be used for UWB and the back cover 44 can be used for BT. However, as suggested above, these roles may be combined, reversed, etc.

The back cover 44 may be metallic and may include aesthetic or cosmetic features. In some embodiments, the battery section 46 may include layered non-conductive and conducive spacers 52, 54, 56 or gaps. These elements 52, 54, 56 may be used in configurations such that additional parts are not needed to create antennas. The tracker tag 40 includes a novel antenna design to support a BT antenna and two UWB antennas (e.g., diversity and/or for angle of arrival).

Figure 4A:
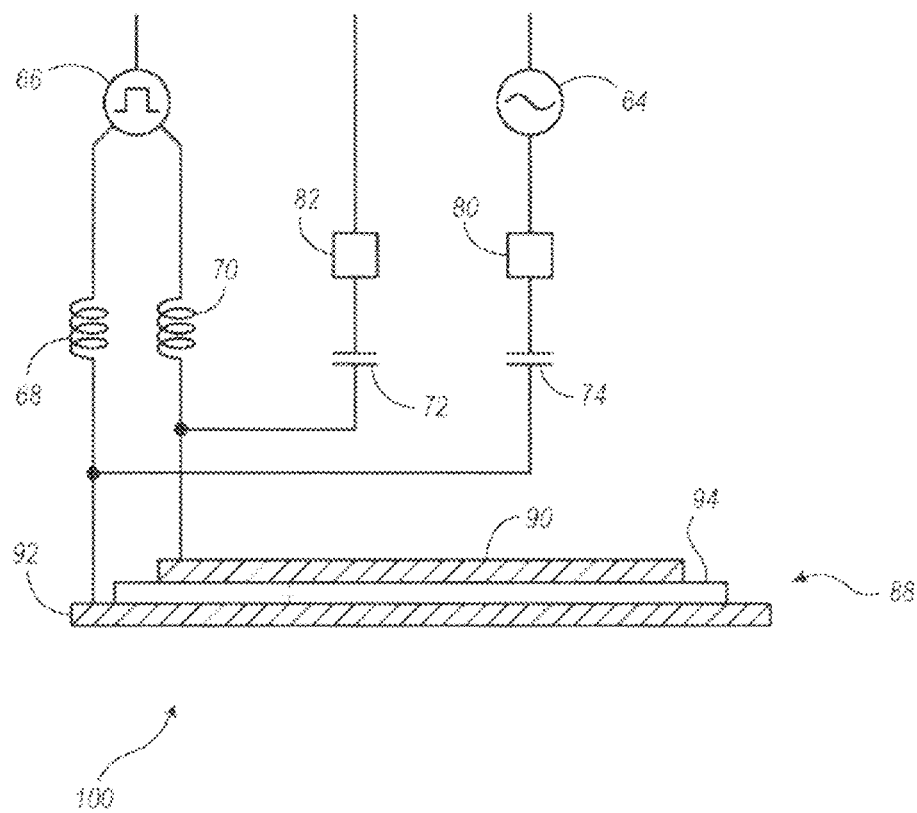
FIG. 4A is a schematic diagram illustrating a portion of the tracking tag of FIG. 3 that includes a piezoelectric circuit and related antenna, according to various embodiments of the present disclosure.

FIG. 4A is a schematic diagram illustrating an embodiment of an electrical circuit 100 that includes a portion of the tracking tag 40 of FIG. 3. In this embodiment, the electrical circuit 100 includes the piezoelectric section 50 and the portion of the circuitry section 48 related to UWB communication. As illustrated, the piezoelectric driver 66 is implemented as a pulse wave generator for providing pulse signals to the first and second conductive plates 90, 92 of the piezoelectric device 88. Also, the UWB radio 64 is implemented in this embodiment as a sinusoidal wave generator for providing UWB radio signals through the feed matching circuit 80 and DC blocking capacitor 74 to the second conductive plate 92, which may be positioned adjacent to the front cover 42. In some embodiments, the UWB radio signals may pass through the UWB switch 86 (not shown in FIG. 4A). UWB radio signals include a return path through the dielectric plate 94 (with a capacitance), through the first conductive plate 90, through the DC blocking capacitor 72, through the short matching circuit 82, and finally back to the ground terminal of the RF board 60. It should be noted that the high-frequency-blocking inductor (or choke) 70 substantially blocks this return signal path going to the piezoelectric driver 66.

Figure 4B:
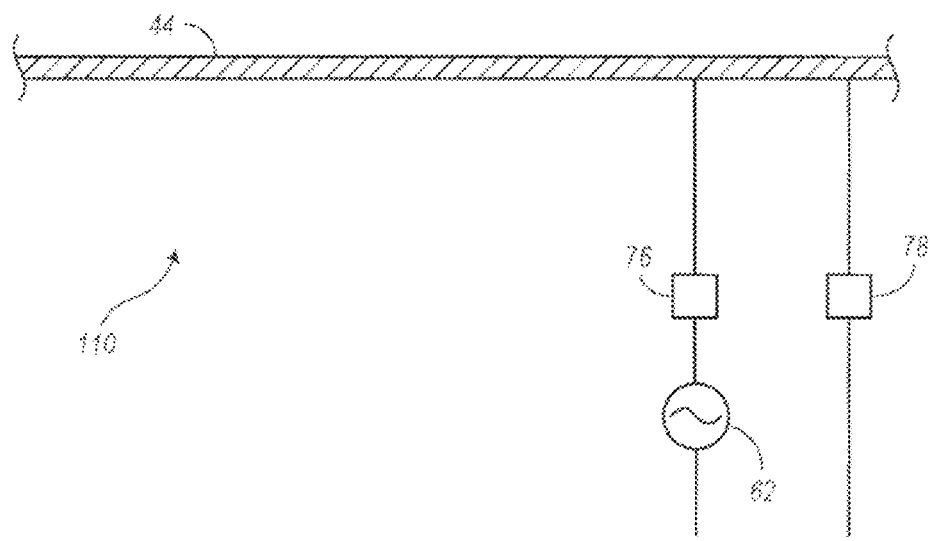
FIG. 4B is a schematic diagram illustrating a portion of the tracking tag of FIG. 3 that includes a housing cover and a related antenna, according to various embodiments of the present disclosure.

FIG. 4B is a schematic diagram illustrating an embodiment of an electrical circuit 110 that includes a portion of the tracking tag 40 of FIG. 3. In this embodiments, the electrical circuit 110 includes the back cover 44 and the portion of the circuitry section 48 related to BT communication. As illustrated, the BT radio 62 is implemented as a sinusoidal wave generator for providing BT radio signals through the BT feed matching circuit 76 to the back cover 44, which includes conductive antenna structure for wireless transmission. The return signal is provided through the short matching circuit 78 and back to the ground terminal of the RF board 60.

In the embodiments of FIGS. 4A and 4B, two antennas are arranged on opposite sides of the common ground of the RF board 60. The UWB antenna in this embodiment includes parallel plates with a dielectric in between. RF choke and DC blocks are leveraged to allow for simultaneous operation of UWB transmission and audio (e.g., buzzing) piezoelectric action.

According to various embodiments of the present disclosure, the tracker tag 40 may have metallic (as opposed to plastic) top and bottom covers. In some embodiments, the covers may be fully metallic and still contain antennas that radiate outside the housing. The embodiments may use a piezoelectric system as part of one or more antennas. The tracker tag 40 may use UWB only, BT only, or a combination of both BT and UWB. The path of antenna currents goes to one plate on one side of the dielectric plate 94 of the piezoelectric element 88 then capacitively couples through the dielectric plate 94 to a second metal plate (e.g., first conductive plate 90) on the other side of the piezoelectric element 88. The chokes 68, 70 are used to isolate the RF antenna signals from the audio frequency piezoelectric driver 66.

Tuning elements in the UWB feed matching circuit 80 are used to get the piezo-based antenna to resonate at the right frequencies. A shorting connection (e.g., including the UWB short matching circuit 82) is used to help tune the piezo-based antenna. The shorting connection may include the blocking capacitor 72 to allow the RF signals to pass, but block the audio frequency (lower frequency) piezo signal. This shorting connection may have tuning elements (e.g., UWB short matching circuit 82). The positioning of the short may be adjusted to tune the antenna.

In some embodiments, the housing (e.g., front cover 42 and back cover 44) may be an external metal case. In some embodiments, the front cover 42 can be connected directly to the second conductive plate 92 of the piezoelectric element 88. In other embodiments, the metal case can be isolated from the conductive plate 92 by non-conducting material. In this case, the metal housing can operate as a parasitic element, somewhat like the operation of a Yagi antenna.

According to various embodiments, the front cover 42 and/or back cover 44 may act as the BT antenna, such as by reversing the position of the front cover 42 and back cover 44 as shown in FIG. 3. Tuning of the back cover 44 is done with a short that is placed at the correct distance from the RF feed (e.g., BT radio 62 and BT feed matching circuit 76) to the back cover 44. Thus, the shorts and feeds may each have tuning elements. The back cover 44 may be isolated from battery by a metallic spacer 54. The metallic spacer 54 operates as a reflector to reduce currents on the battery 58 as a result of RF signals transmitted from the back cover 44.

In some embodiments, the feed paths may be accomplished with the use of spring loaded pogo pins, spring clips, solder connections, and other suitable elements. Radiation patterns may be concentrated on the edges of the plates, which can minimize the effect as a user holding the tag with his or her fingers. The tracker tag 40 may include feeds close to the edges to help radiating currents travel around the edges. In some embodiments, a casing of the battery 58 can be used as a radiating element, according to further design implementations.

Also, the embodiments of FIGS. 3, 4A, and 4B may include certain features and alternatives. For example, the BT and/or UWB antennas may be fully embedded in already existing parts of the tracker tag 40. In particular, the piezoelectric element 88 may be used for UWB and/or BT. The front cover 42 and back cover 44 may include conductive (e.g., metallic) material on or in all or part of the housing pieces. In some cases, the covers 42, 44 may include aesthetic or cosmetic features, logos, etc. The covers 42, 44 may include layers of conductive and non-conductive plates and/or conductive and non-conductive gaps/spacers. Some parts can be used in some configurations without the need to include additional parts to create antennas.

The present disclosure therefore provides various embodiments that are able to enable UWB and/or BT communication using already existing parts of a tracker tag. A portable tracker device, according to some implementations, may include a housing having a front cover and a back cover. The portable tracker device may also include Radio Frequency (RF) circuitry configured to operate within at least one of a Bluetooth (BT) frequency range and an Ultra-Wideband (UWB) frequency range. Also, the portable tracker device may include a piezoelectric device having a first conductive plate and a second conductive plate. The RF circuitry is configured to utilize at least one of the front cover, the back cover, the first conductive plate, and the second conductive plate as one or more antennas. In some implementations, the piezoelectric device may further include a dielectric plate oriented between the first and second conductive plates. Also, the piezoelectric device may be configured as a buzzer or speaker for creating an audible signal to reveal the location of the portable tracker device.

In some embodiments, the back cover of the housing of the portable tracker device may include a conductive material, such that the back cover is configured as a first antenna of the one or more antennas. The RF circuitry may be configured to use the first antenna for BT communication. The second conductive plate of the piezoelectric device may be positioned adjacent to the front cover of the housing and may be configured as a second antenna of the one or more antennas. The RF circuitry is further configured to use the second antenna for UWB communication. In some embodiments, the front cover of the housing may include a conductive material and may be connected directly to the second conductive plate of the piezoelectric device. The portable tracker device may further include a UWB switch and a diplexer. The UWB switch may be configured to receive a UWB feed from the RF circuitry and create first and second UWB feeds. The first UWB feed may be provided to the diplexer and the second UWB feed may be provided to the second conductive plate of the piezoelectric device. The diplexer may be configured to receive a BT feed from the RF circuitry and the first UWB feed from the UWB switch to thereby create a mixed feed that is provided to the back cover of the housing.

According to some implementations, the portable tracker device may further include a piezoelectric driver in electrical communication with the first conductive plate and the second conductive plate of the piezoelectric device. For example, the piezoelectric driver may be configured to provide signal pulses for driving the piezoelectric device. The portable tracker device may further include a battery configured to provide power to the RF circuitry and the piezoelectric driver. The portable tracker device may also include first and second inductors, where the first inductor may be configured to substantially isolate RF signals of the first conductive plate from audio signals of the piezoelectric driver and the second inductor may be configured to substantially isolate RF signals of the second conductive plate from the audio signals of the piezoelectric driver.

In addition, at least one of the front cover, the back cover, the first conductive plate, and the second conductive plate, as described above, may be used as the one or more antennas and may further be configured without any dedicated antenna structure. In some embodiments, the portable tracker device may further include feed matching circuitry and short matching circuitry. The feed matching circuitry may be configured for matching BT and UWB frequencies with the one or more antennas and the short matching circuitry may be configured for matching the one or more antennas to ground. The portable tracker device may further include first and second capacitors. For example, the first capacitor may be configured for substantially isolating audio frequency signals of the first conductive plate from the short matching circuitry and the second capacitor may be configured for substantially isolating audio frequency signals of the second conductive plate from the feed matching circuitry.

The back cover of the housing may include a conductive material and may be oriented in parallel with the second conductive plate of the piezoelectric device to form a Yagi-type antenna. The portable tracker device may also include a battery and a battery holder. The battery may be configured to provide power to the RF circuitry, and the battery holder may be configured to support the battery and one or more layers of conductive and non-conductive plates separating the battery from the back cover. One or more of the front cover and back cover may include 1) a non-conductive material and 2) a Laser Direct Structuring (LDS) conductive pattern, conductive tape, and/or conductive trace formed on the non-conductive material. In some embodiments, the portable tracker device may also include one or more pogo pins configured to enable electrical communication between the RF circuitry and the one or more antennas.

In addition to the portable tracker device described above, the present disclosure further provides embodiments of antenna assemblies. In one embodiment, an antenna assembly may include one or more of a front cover and a back cover of a housing for a portable electronic device. The antenna assembly may also include one or more of a first conductive plate and a second conductive plate of a piezoelectric device. In this embodiment, an RF circuit may be configured to operate within at least one of a Bluetooth (BT) frequency range and an Ultra-Wideband (UWB) frequency range. Also, the RF circuit may be configured to utilize at least one of the front cover, the back cover, the first conductive plate, and the second conductive plate as one or more antennas. According to additional embodiments of this antenna assembly, the back cover of the housing may include a conductive material and may be configured as a first antenna of the one or more antennas. The second conductive plate of the piezoelectric device may be positioned adjacent to the front cover of the housing and may be configured as a second antenna of the one or more antennas. Also, the RF circuitry may be configured to use the first antenna for BT communication and use the second antenna for UWB communication.

Figure 5A:
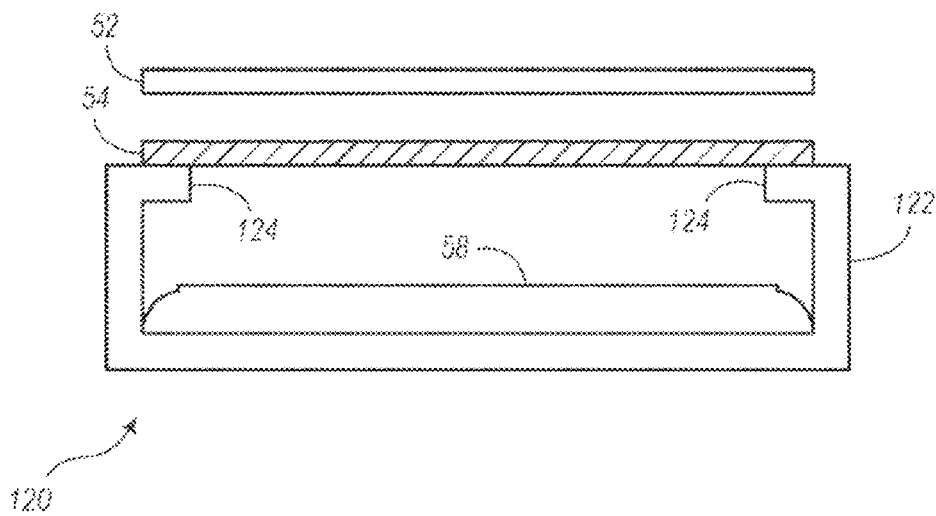
FIGS. 5A-5C are diagrams illustrating cross-sectional side views of the battery holder shown in FIG. 3, according to various embodiments of the present disclosure.
Figure 5B:
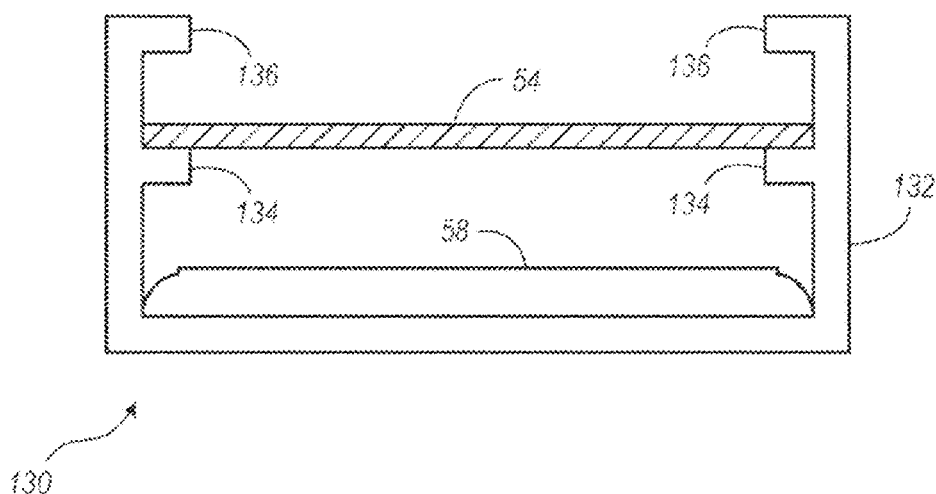
Figure 5C:
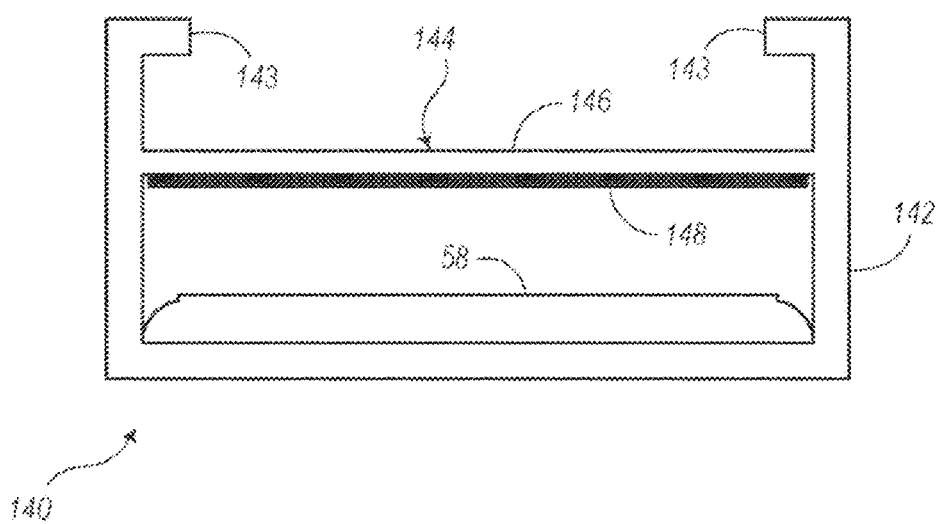

FIGS. 5A-5C are diagrams illustrating cross-sectional side views of various embodiments of battery holders for supporting the battery 58 shown in FIG. 3 and corresponding conductive and non-conductive plates. In some embodiments, the non-conductive plates may be replaced by a space or gap. Also, the drawings may represent a partially exploded view, in some cases, whereby the adjacent layers, during manufacture, may be positioned in contact with each other.

As shown in FIG. 5A, a battery section 120 (as compared with battery section 46 shown in FIG. 3) includes a battery holder 122, which may be non-conductive (e.g., plastic). The battery 58 may be placed at the bottom of the battery holder 122, as illustrated. In this embodiment, the battery holder 122 may include supports 124 configured to hold the conductive plate 54 a certain distance from the battery 58. The non-conductive plate 52 is arranged above the conductive plate 54 adjacent to the back cover 44. In this embodiment, the non-conductive plate 56 is omitted and replaced by a gap formed between the conductive plate 54 and the battery 58.

As shown in FIG. 5B, a battery section 130 (as compared with battery section 46 shown in FIG. 3) includes a battery holder 132, which may be non-conductive (e.g., plastic). The battery 58 may be placed at the bottom of the battery holder 132, as illustrated. In this embodiment, the battery holder 132 may include first supports 134 and second supports 136. The first supports 134 may be configured hold the conductive plate 54 a certain distance from the battery 58. The second supports 136 are configured to create a distance between the conductive plate 54 and the back cover 44. In this embodiment, the non-conductive plates 52, 56 may be omitted and replaced by gaps formed between the back cover 44, the conductive plate 54, and the battery 58.

As shown in FIG. 5C, a battery section 140 (as compared with battery section 46 shown in FIG. 3) includes a battery holder 142, which may be non-conductive (e.g., plastic). The battery 58 may be placed at the bottom of the battery holder 142, as illustrated. In this embodiment, the battery holder 142 may include supports 143. Also, the battery holder 142 includes a lid 144, which may include a non-conductive layer 146 and a conductive layer 148. For example, the non-conductive layer 146 may be built into the battery holder 142 and the conductive layer 148 may be a conductive pattern (e.g., LDS), conductive tape (e.g., copper, aluminum, etc.), etc. A gap may be formed between the conductive layer 148 and the battery. Also, the supports 143 may be configured to create a distance between the lid 144 the back cover 44, if needed. In this embodiment, the non-conductive plates 52, 56 may be omitted and replaced by gaps formed between the back cover 44, the lid 144, and the battery 58.

Figure 6A:
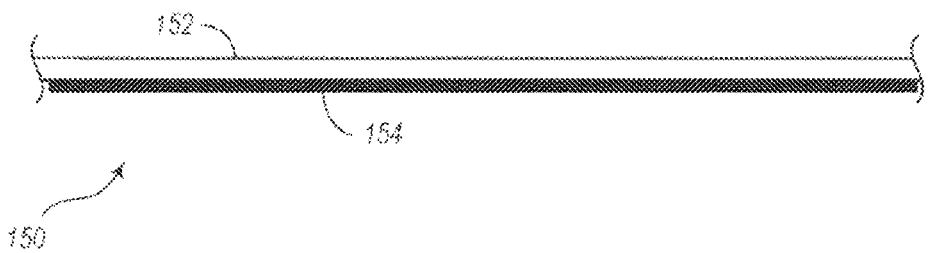
FIGS. 6A and 6B are diagrams illustrating cross-sectional side views of the cover shown in FIG. 3, according to various embodiments of the present disclosure.
Figure 6B:
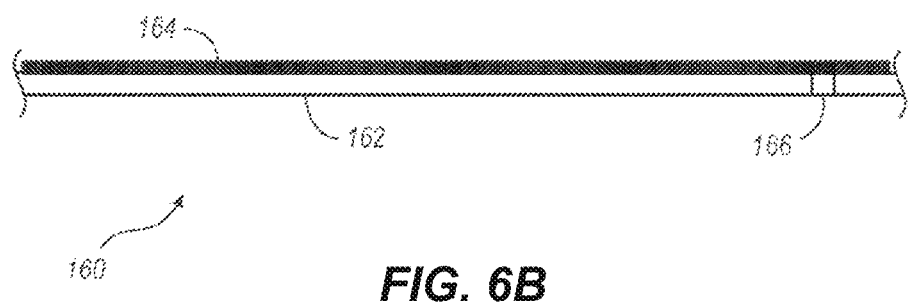

FIGS. 6A and 6B are diagrams illustrating cross-sectional side views of embodiments of a back cover (as compared with the back cover 44 shown in FIG. 3). In FIG. 6A, the back cover 150 is a first embodiment where a non-conductive layer 152 (e.g., non-metallic layer, plastic layer, etc.) has a conductive layer 154 formed on a bottom surface of the non-conductive layer 152. The conductive layer 154 may be an LDS conductive pattern, conductive tape, copper, aluminum, etc. In this case, the non-conductive layer 152 is exposed to the exterior environment.

In FIG. 6B, the back cover 160 is a second embodiment where a non-conductive layer 162 has a conductive layer 164 formed on a top surface of the non-conductive layer 162. The conductive layer 164 may be an LDS conductive pattern, conductive tape, copper, aluminum, etc., and may be exposed to the exterior environment. In this embodiment, an access area 166 may be formed in the non-conductive layer 162 to provide electrical access to the electrical components (e.g., BT radio 62, BT feed matching circuit 76, BT short matching circuit 78, etc.). A suitable electrical connection (e.g., pogo pins) may be arranged between electrical circuitry and the conductive layer 164 to allow the conductive layer 164 to act as an antenna.

Figure 7A:
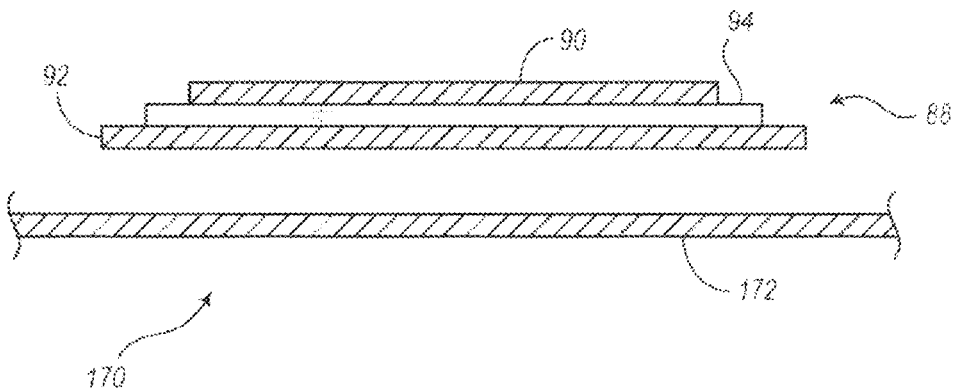
FIGS. 7A and 7B are diagrams illustrating cross-sectional side views of the piezoelectric device shown in FIG. 3, according to various embodiments of the present disclosure.
Figure 7B:
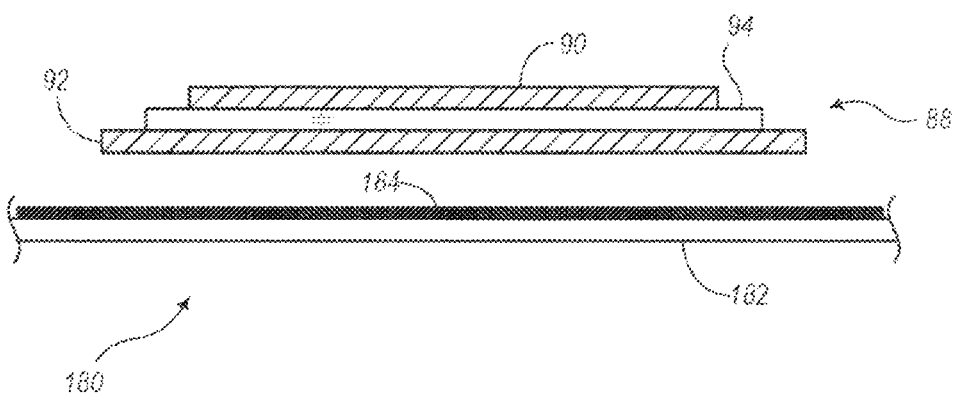

FIGS. 7A and 7B are diagrams illustrating cross-sectional side views of embodiments of the front cover 42 and piezoelectric section 50 shown in FIG. 3. Although the diagram show some of the elements in a partially exploded view, the adjacent layers in some embodiments may be arranged in contact with each other.

In FIG. 7A, the front cover 170 (as compared with the front cover 42 shown in FIG. 3) may include a conductive material, such as metal, or include a layer or pattern of LDS, conductive tape, or other suitable conductive patterns or elements arranged on a non-conductive substrate. In some embodiments, the conductive portion or portions of the front cover 170 may be arranged in contact with the second conductive plate 92, which may be acting as an antenna. In this respect, when the conductive portions of the front cover 170 are in contact with the conductive portions of the second conductive plate 92, the front cover 170 may therefore also act as an antenna or portion of this antenna.

In FIG. 7B, the front cover 180 (as compared with the front cover 42 shown in FIG. 3) may include non-conductive layer 182 (e.g., non-metallic material, plastic, etc.) and a conductive layer 184 formed on a top surface of the non-conductive layer 182. In this respect, the non-conductive layer 182 may be exposed to the exterior environment. The conductive layer 184 may include a conductive material, such as metal, or include a layer or pattern of LDS, conductive tape, or other suitable conductive patterns or elements arranged on the non-conductive substrate of the non-conductive layer 182. In some embodiments, portions of the conductive layer 184 may be arranged in contact with the second conductive plate 92, which may be acting as an antenna. In this respect, when the conductive layer 184 of the front cover 180 is in contact with the conductive portions of the second conductive plate 92, the front cover 180 may therefore also act as an antenna or portion of this antenna.

Figure 8A:
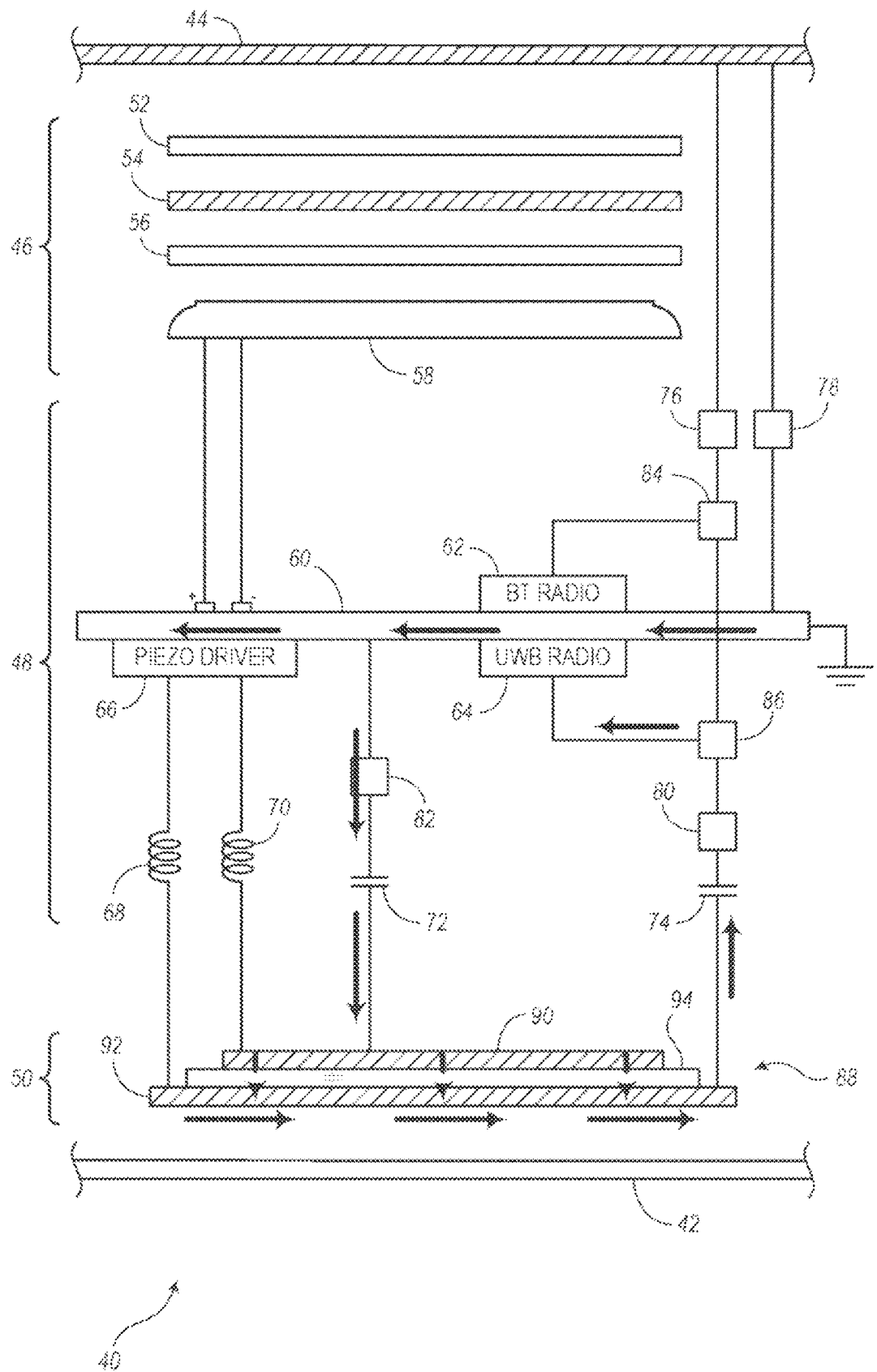
FIG. 8A is a schematic diagram illustrating the portion of the tracking tag shown in FIG. 4A and relative electrical currents of the antenna associated with the piezoelectric device, according to various embodiments of the present disclosure.

FIG. 8A shows the tracking tag 40 shown in FIG. 3 and the corresponding electrical currents when the UWB antenna of FIG. 4A is in operation. For example, the tracking tag 40 may be configured to provide two channels of UWB operation, such as channel 5 (i.e., frequency range between about 6.25 GHz and about 6.75 GHz and centered around 6.50 GHz) and channel 9 (i.e., frequency range between about 7.75 GHz and 8.25 GHz and centered around 8.00 GHz). Larger arrows in FIG. 8A represent greater currents, while smaller arrows represent lower currents. Dashed arrows represent electric fields (e.g., between piezoelectric plates).

Figure 8B:
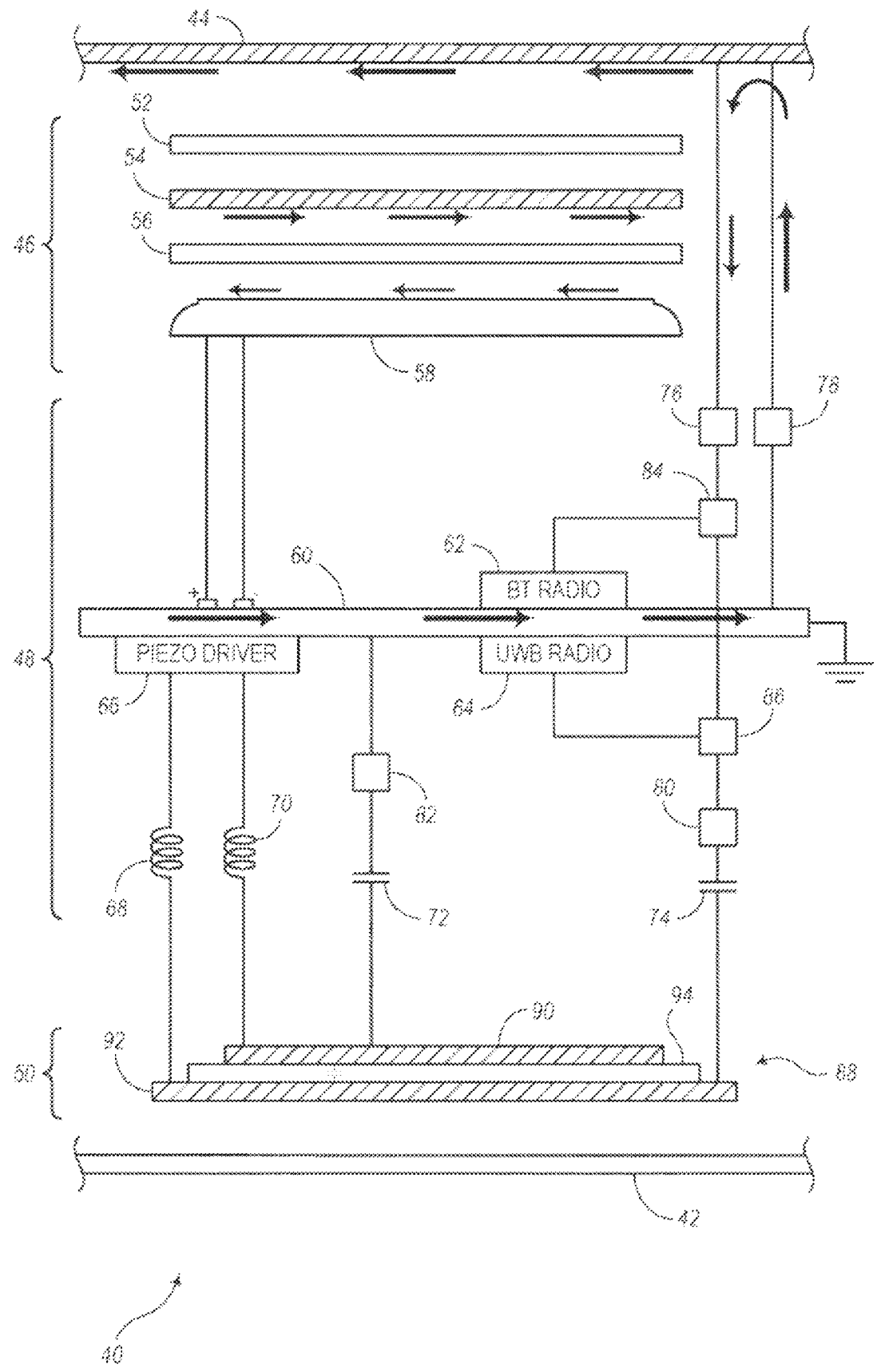
FIG. 8B is a schematic diagram illustrating the portion of the tracking tag shown in FIG. 4B and relative electrical currents of the antenna associated with the housing cover, according to various embodiments of the present disclosure.

FIG. 8B shows the tracking tag 40 shown in FIG. 3 and the corresponding electrical currents when the BT antenna of FIG. 4B is in operation. For example, the tracking tag 40 may be configured to provide both BT and UWB operation, whereby, when the UWB radio 64 provides dual UWB signals, the UWB switch 86 is configured to send a first set of UWB signals to the diplexer 84 and send a second set of UWB signals to the UWB feed matching circuit 80 (for the UWB operation described with respect to FIG. 8A). The first set of UWB signals in this embodiment may combined with the BT signals from the BT radio 62 to provide both BT and UWB communication with respect to the antenna arrangement of using the back cover 44. Thus, dual band operation includes the BT signals at a frequency of about 2.40 GHz and the UWB signals at channel 5 or channel 9 frequencies centered at about 6.5 GHz or 8.0 GHz, respectively.

In some embodiments, one or more metallic spacers (e.g., conductive plate 54) may act as a reflector to shield the back cover 44 from the battery 58, which may be lossy. Consequently, much less current is induced into the battery 58. Again, larger arrows represent greater currents, while smaller arrows represent lower currents. The second set of UWB signals may also be configured to operate with the short matching circuit 78, which can also provide BT short matching. In some embodiments, however, the short matching circuit 78 may be replaced with a switch to allow for operation with respect to one or more of BT, Wi-Fi, Zigbee, or other protocols. The UWB switch 86, according to some embodiments, may be a UWB diversity switch or an Angle of Arrival switch. Alternatively, the UWB radio 64 can have two antenna ports, which may allow the UWB switch 86 to be omitted in some embodiments.

Figure 9:
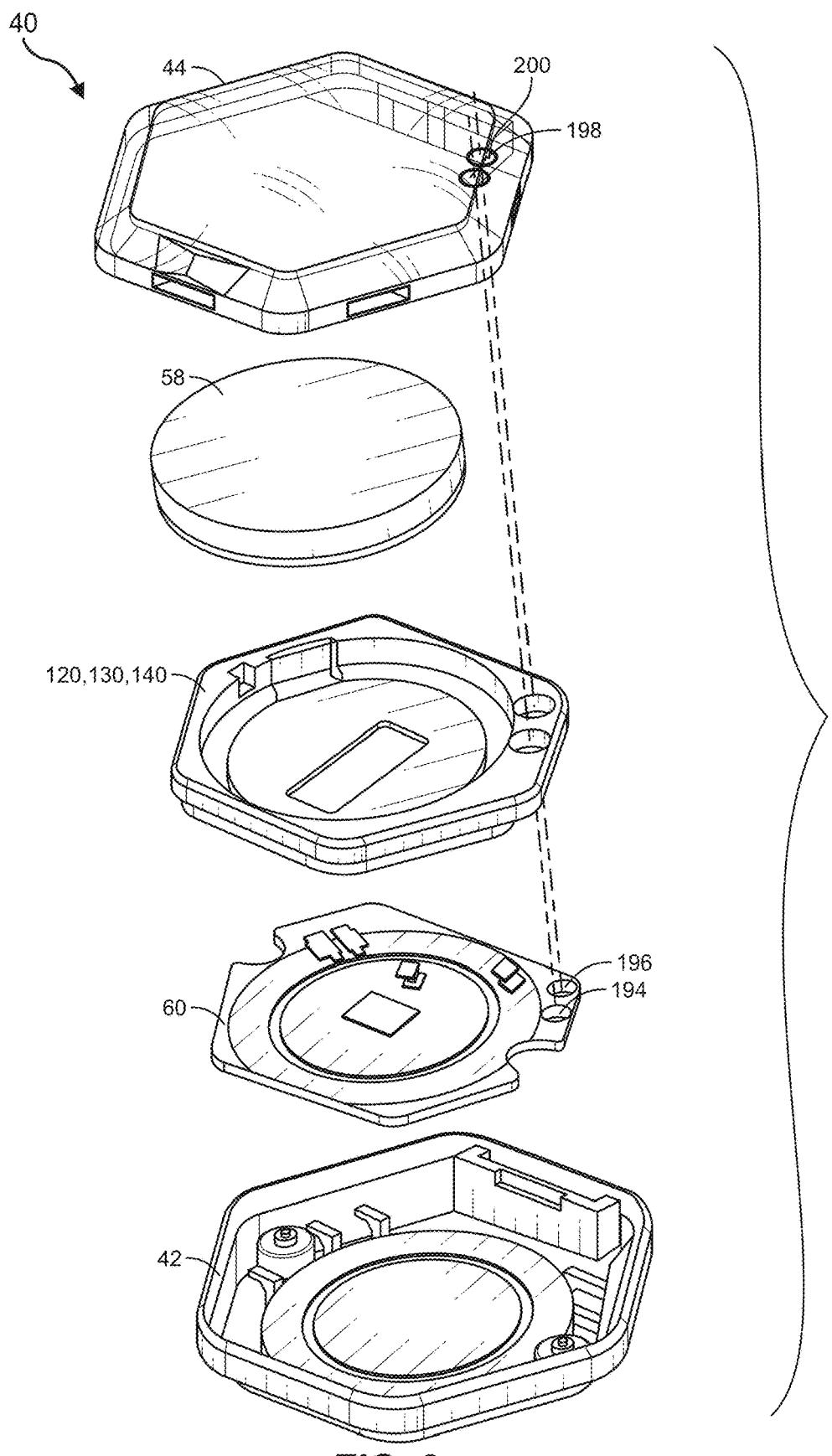
FIG. 9 is a diagram illustrating an exploded perspective view of the tracking tag of FIG. 3, according to various embodiments of the present disclosure.
Figure 10:
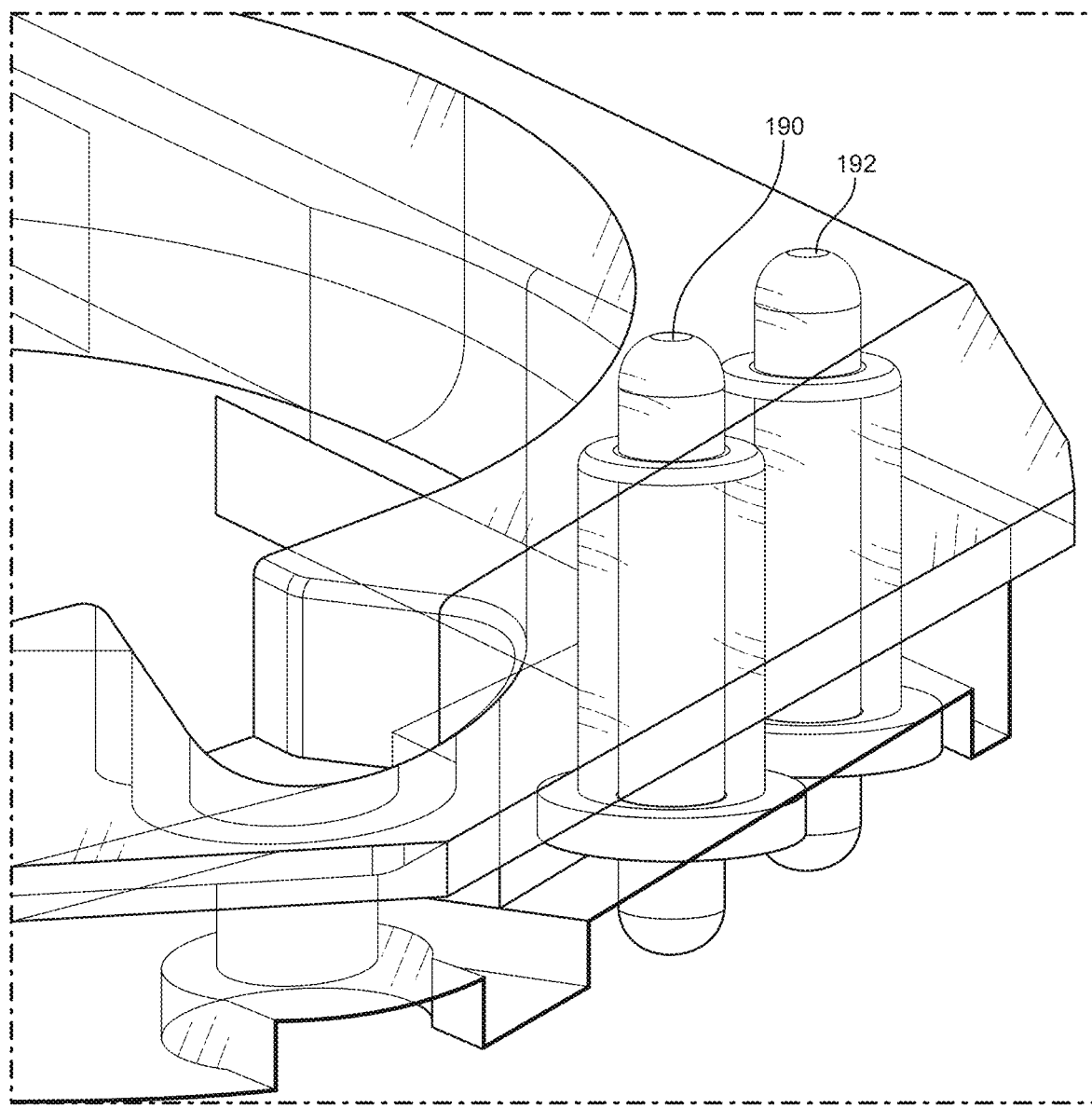
FIG. 10 is a diagram illustrating a partial view of pogo pins for contacting the antennas of the tracking tag of FIG. 3, according to various embodiments of the present disclosure.

FIG. 9 is a diagram illustrating an exploded perspective view of the tracking tag 40. FIG. 10 is a diagram illustrating a partial view of the tracker tag 40 and shows pogo pins 190, 192 for contacting the antennas of the tracking tag 40. In these embodiments, the tracker tag 40 may include a stack-up implementation whereby the pogo pins 190, 192 may be inserted into a non-conductive battery holder (e.g., battery holders 120, 130, 140). The pogo pins 190, 192 extend in both direction (e.g., front and back) and are configured to contact the RF board 60 at ports 194, 196, respectively, on one end and contact the back cover 44 at ports 198, 200 on the other end. In some embodiments, spring fingers (not shown) may be designed for contact with the front-positioned UWB antenna (e.g., piezoelectric antenna utilizing the second conductive plate 92) using the second set of UWB signals for feeding (exciting) the second conductive plate 92. For example, at UWB (and BT) frequencies, the two plates may be electrically short due to large parasitic capacitance.

It may be noted that the operation of the tracker tag 40 may include radiation from the respective antennas in certain patterns. Most radiation may be due to currents on the edge of the back cover 44. The currents on the outside surface of the back cover 44 may be insignificant compared to the edges of the back cover 44. With respect to the piezoelectric-based antenna, the current on the second conductive plate 92 may contribute to the UWB radiation. Most radiation is due to currents on the bottom of the metallic plate.

Radiation patterns for BT at 2.4 GHz may be similar to a dipole antenna and/or may be close to an omni-directional antenna with two nulls on opposite sides. The radiation pattern for the first UWB antenna at 6.5 GHz (e.g., utilizing the back cover 44) may be similar to a patch antenna (e.g., low front to back radiation, mostly in a direction away from the underside of the back cover 44). The radiation pattern for the second UWB antenna at 6.5 GHz (e.g., utilizing the piezoelectric element 88) may be similar to a patch antenna (e.g., low front to back radiation, mostly in a direction away from the underside of the second conductive plate 92).

FIGS. 11 and 12 are diagrams illustrating front views of various parts of the tracking tag 40. The battery holder 120, 130, 140 may be made of plastic and its features can be used to replace spacers/gaps (e.g., layers 52, 56) between the battery 58 and the back cover 44. Metallic spacers can be implemented into battery holders 120, 130, 140 using LDS, metallic tape, etc. In some embodiments, these metallic spacers may be incorporated in the edge of the battery holder 120, 130, 140.

The LDS process may use a thermoplastic material, doped with metallic inorganic compounds in an injection molding process. However, instead of LDS processes, the tracker tag 40 may be a Molded Interconnect Device (MID) manufactured with an injection-molded thermoplastic part having integrated electronic circuit traces.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A portable tracker device comprising:
a housing having a front cover and a back cover;
Radio Frequency (RF) circuitry configured to operate within at least one of a Bluetooth (BT) frequency range and an Ultra-Wideband (UWB) frequency range; and
a piezoelectric device having a first conductive plate and a second conductive plate;
wherein the RF circuitry utilizes at least one of the front cover, the back cover, the first conductive plate, and the second conductive plate as one or more antennas;
wherein the back cover of the housing includes a conductive material and is configured as a first antenna of the one or more antennas, and wherein the RF circuitry is configured to use the first antenna for BT communication; and
wherein the second conductive plate of the piezoelectric device is positioned adjacent to the front cover of the housing and is configured as a second antenna of the one or more antennas, and wherein the RF circuitry is further configured to use the second antenna for UWB communication.

2. The portable tracker device of claim 1, wherein the piezoelectric device further includes a dielectric plate oriented between the first and second conductive plates, and wherein the piezoelectric device is configured as a buzzer or speaker for creating an audible signal to reveal the location of the portable tracker device.

3. The portable tracker device of claim 1, wherein the front cover of the housing includes a conductive material and is connected directly to the second conductive plate of the piezoelectric device.

4. The portable tracker device of claim 1, further comprising a UWB switch and a diplexer, wherein the UWB switch is configured to receive a UWB feed from the RF circuitry and create first and second UWB feeds, wherein the first UWB feed is provided to the diplexer, wherein the second UWB feed is provided to the second conductive plate of the piezoelectric device, and wherein the diplexer is configured to receive a BT feed from the RF circuitry and the first UWB feed from the UWB switch to thereby create a mixed feed that is provided to the back cover of the housing.

5. The portable tracker device of claim 1, further comprising a piezoelectric driver in electrical communication with the first conductive plate and the second conductive plate of the piezoelectric device, wherein the piezoelectric driver is configured to provide signal pulses for driving the piezoelectric device.

6. The portable tracker device of claim 5, further comprising a battery configured to provide power to the RF circuitry and the piezoelectric driver, in which a battery case is used as a radiating antenna element.

7. The portable tracker device of claim 5, further comprising first and second inductors, wherein the first inductor is configured to substantially isolate RF signals of the first conductive plate from audio signals of the piezoelectric driver, and wherein the second inductor is configured to substantially isolate RF signals of the second conductive plate from the audio signals of the piezoelectric driver.

8. The portable tracker device of claim 1, wherein at least one of the front cover, the back cover, the first conductive plate, and the second conductive plate used as the one or more antennas is configured without any dedicated antenna structure.

9. The portable tracker device of claim 1, further comprising feed matching circuitry and short matching circuitry, wherein the feed matching circuitry is configured for matching BT and UWB frequencies with the one or more antennas, and wherein the short matching circuitry is configured for matching the one or more antennas to ground.

10. The portable tracker device of claim 9, further comprising first and second capacitors, wherein the first capacitor is configured for substantially isolating audio frequency signals of the first conductive plate from the short matching circuitry, and wherein the second capacitor is configured for substantially isolating audio frequency signals of the second conductive plate from the feed matching circuitry.

11. The portable tracker device of claim 1, wherein the back cover of the housing includes a conductive material and is oriented in parallel with the second conductive plate of the piezoelectric device to form a Yagi-type antenna.

12. The portable tracker device of claim 1, further comprising a battery and a battery holder, wherein the battery is configured to provide power to the RF circuitry, and wherein the battery holder is configured to support the battery and one or more layers of conductive and non-conductive plates separating the battery from the back cover.

13. The portable tracker device of claim 1, wherein one or more of the front cover and back cover includes:
a non-conductive material; and
one or more of a Laser Direct Structuring (LDS) conductive pattern, conductive tape, and conductive trace formed on the non-conductive material.

14. The portable tracker device of claim 1, further comprising one or more pogo pins or spring clips configured to enable electrical communication between the RF circuitry and the one or more antennas.

15. The portable tracker device of claim 1, wherein both the front cover and the back cover are metallic, in which one or more of the covers serves as the one or more antennas.

16. The portable tracker of device of claim 1, wherein one of the front cover and the back cover operates as a BT antenna and the other as a UWB antenna.

17. An antenna assembly comprising:
one or more of a front cover and a back cover of a housing of a portable electronic device; and
one or more of a first conductive plate and a second conductive plate of a piezoelectric device;
wherein a Radio Frequency (RF) circuit, configured to operate within at least one of a Bluetooth (BT) frequency range and an Ultra-Wideband (UWB) frequency range, utilizes at least one of the front cover, the back cover, the first conductive plate, and the second conductive plate as one or more antennas;
wherein the back cover of the housing includes a conductive material and is configured as a first antenna of the one or more antennas, and wherein the RF circuitry is configured to use the first antenna for BT communication; and
wherein the second conductive plate of the piezoelectric device is positioned adjacent to the front cover of the housing and is configured as a second antenna of the one or more antennas, and wherein the RF circuitry is further configured to use the second antenna for UWB communication.

18. A locating system comprising:
one or more tracker tags; and
one or more searching devices;

wherein each of the one or more tracker tags includes
a housing having a front cover and a back cover,
Radio Frequency (RF) circuitry configured to operate within at least one of a Bluetooth (BT) frequency range and an Ultra-Wideband (UWB) frequency range, and
a piezoelectric device having a first conductive plate and a second conductive plate,
wherein the RF circuitry utilizes at least one of the front cover, the back cover, the first conductive plate, and the second conductive plate as one or more antennas; and
wherein each of the one or more searching devices is configured to locate the one or more tracker tags using one or more of BT communication and UWB communication with the one or more tracker tags;
wherein the back cover of the housing includes a conductive material and is configured as a first antenna of the one or more antennas, and wherein the RF circuitry is configured to use the first antenna for BT communication; and
wherein the second conductive plate of the piezoelectric device is positioned adjacent to the front cover of the housing and is configured as a second antenna of the one or more antennas, and wherein the RF circuitry is further configured to use the second antenna for UWB communication.

\* \* \* \* \*